Feb. 26, 1957  V. ACQUARONE  2,783,288
ELECTRIC SLAG RESISTANCE FURNACE
Filed Dec. 9, 1953
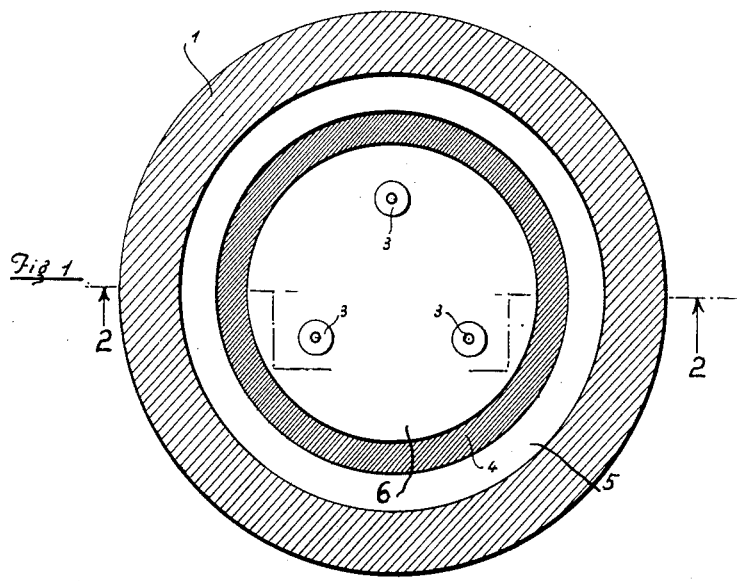
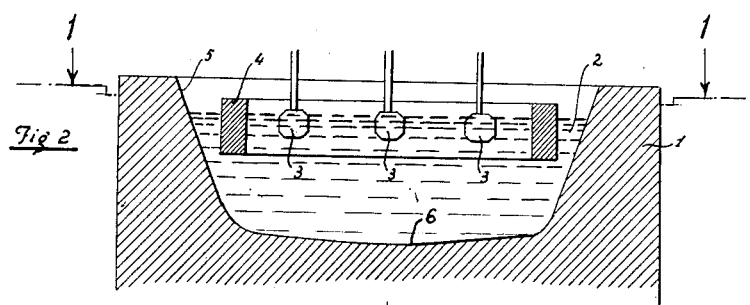
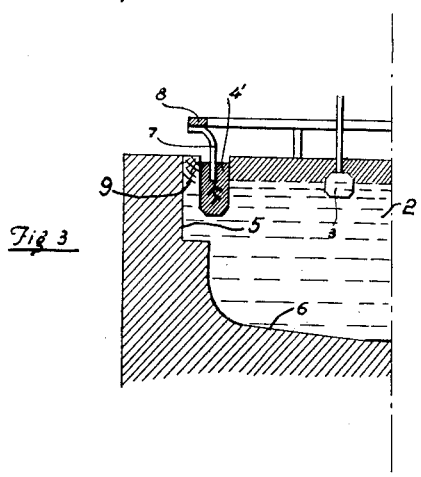
INVENTOR:
VINCENZO ACQUARONE, United States Patent Office 2,783,288
Patented Feb. 26, 1957

2,783,288

ELECTRIC SLAG RESISTANCE FURNACE

Vincenzo Acquarone, Turin, Italy

Application December 9, 1953, Serial No. 397,156

Claims priority, application Italy December 13, 1952

7 Claims. (Cl. 13—23)

The present invention relates to a device for improving the working conditions of an electric furnace heated by the electric resistance of molten slag (or molten salts) in which the electrodes are immersed, and to a device for realising the method.

More particularly, the invention relates to furnaces of the said type in which the treatment of material in powder form is carried on, the latter being disposed in an approximately uniform manner on the bath of molten slag or molten salts, either for metallurgic or chemical purposes.

From experiments carried out with these furnaces it was found that the most important reactions take place on the contact between the slag and the overlying layer of the material to be smelted, and therefore it is desirable that the heat is developed as much as possible near the surface of the slag bath for a better utilization of it under reduction of losses.

A concentration of the heat in the said zone is also useful to avoid an excessive heating and the consequent corrosion of the walls and bottom of the hearth. The most possible therefore shall be done to cause the lines of electric current to be deviated upwards, i. e. towards the surface of the slag bath, thereby avoiding that the electric circuit has a tendency to close on the bottom and the walls of the furnace.

This is attained by the method defined by the invention and which consists in disposing on the slag (or salt) bath and, at least partly immersing therein, a current-leading body having a form with closed perimeter such as to enclose the projection, on the free surface of the bath, of the contours of all the electrodes working therein.

Generally, such a body will be given the form of a ring capable of enclosing the zone in which the electrodes are located and which may be supported by the furnace walls or swim on the slag so as to accompany the variations of level.

The advantages derived therefrom are the following:

(1) The ring, acting as neutral point, deviates upwards the direction of the current lines and hence moves upwards, i. e. towards the free surface of the bath, the centre of the zone wherein heat is developing.

(2) Moreover, by concentrating the heat at its center, the ring reduces the difference of temperature between centre and periphery, or, in other words, it diminishes the disuniformity of temperature from one point to another of the bath surface.

(3) The presence of the ring prevents, or at least strongly reduces, the corrosion of the bottom and walls by the substances contained in the hearth, and that because of the mechanical protection it affords and of the variation it introduces into the electric field.

(4) The substance of which the ring is made is less expensive than that of which the furnace bottom and walls are built; a replacement of the ring involves an expenditure and takes a time hardly comparable with the cost and time required for relining the furnace (an operation which involves the stopping of the furnace); for this reason the operation of a furnace provided with the protecting device according to the invention may be forced. This means that at equal production and potentiality the furnace may be given much smaller dimensions and costs much less than a furnace of a known type.

(5) The ring stops the convection movements inside the slag bath, limiting same to the zone enclosed by the ring, thereby also preventing the chemico-mechanical erosion of the furnace wall.

(6) When the furnace is operated for a metallurgical reduction process, the ring made of a carbonaceous material fulfills another important task, by deoxidizing the slag.

For a better understanding reference is made to the accompanying drawing on which Fig. 1 is a horizontal sectional view of a furnace provided with the improvement defined by the invention, the section being taken on line 1—1 of Fig. 2;

Fig. 2 is a fragmentary vertical sectional view thereof taken on line 2—2 of Fig. 1; and Fig. 3 is a fragmentary sectional view similar to Fig. 2 but embodying a modification.

With reference to the drawing, the furnace 1 contains a slag bath 2 with electrodes 3 therein immersed.

The latter are located inside a ring 4 of a carbonaceous material, at least partly immersed in the slag bath 2.

The charge of material in powder form, distributed possibly in a uniform manner on the slag bath, covers also the ring 4.

In this way there is obtained a protection of the wall 5 and bottom 6 of the furnace, besides realising the advantages emphasized hereinbefore. In particular, there is avoided an excess of temperature from the passage of current between the bath and wall, and prevented that the convective movements departing from the electrodes and directed to the periphery come into contact with the wall, by stopping them as they contact the ring 4; lastly, a direct contact between the wall and the charge is also avoided.

In the modification according to Fig. 3, the ring 4' has an internal metallic reinforcing fitting leading to some clamps 7 which connect the said ring to an external metallic ring 8 carried by the furnace fittings.

In this manner, a continuity of the circuit is ensured at all times, even in the case where, during the operation, the ring 4' undergoes deformations; this ring may be built up of independent sectors connected metallically with one another.

Between ring and wall, in the case of metallurgical applications, coal in pieces 9 can advantageously be placed, in order to avoid heat losses.

I claim:

1. In an electric slag resistor furnace, having a receptacle for the slag bath and three electrodes extending into said slag bath, in combination, means at least partially immersed in the slag bath and encircling all of said electrodes.

2. An electric furnace, as claimed in claim 1, said means being endless defining on its interior an area coinciding with the zone of maximum heat generated in said slag bath by said electrodes.

3. In an electric slag resistor furnace, having a receptacle including a bottom and side walls for holding a slag bath and three electrodes dipping into said bath and being interconnected to an electric source, and means operable for concentrating at least the major portion of the heat generated by said electrodes in a zone, said means comprising an annular member at least partially immersed in the slag bath and encircling said zone and being spaced from said wall, said member being composed of conductive material.

4. An electric furnace, as claimed in claim 3, said member being composed of carbonaceous material.

5. An electric slag resistor furnace, as claimed in claim 3, and metallic means connected to said member and insulated from said electrodes, for reinforcing said member.

6. An electric slag resistor furnace, as claimed in claim 3, said member being electrically grounded.

7. An electric slag resistor furnace, as claimed in claim 3, together with carbonaceous pieces disposed in said slag bath between said member and said wall to restrain heat dissipation.

References Cited in the file of this patent

UNITED STATES PATENTS

| | | |
|---|---|---|
| 1,842,272 | Knerr | Jan. 19, 1932 |
| 2,965,080 | Kemmer | July 3, 1934 |
| 2,300,355 | Ellefsen | Oct. 27, 1942 |
| 2,303,122 | Heineman | Nov. 24, 1942 |
| 2,448,886 | Hopkins | Sept. 7, 1948 |
| 2,671,124 | Bagley | Mar. 2, 1954 |

FOREIGN PATENTS

| | | |
|---|---|---|
| 226,342 | Switzerland | July 1, 1943 |
| 349,830 | Great Britain | June 4, 1931 |
| 611,609 | Germany | Mar. 30, 1935 |
| 725,932 | Germany | Oct. 2, 1942 |